United States Patent [19]

Doroszkowsky et al.

[11] 4,434,268

[45] Feb. 28, 1984

[54] MANUFACTURE OF POLYMER DISPERSIONS

[75] Inventors: Andrew Doroszkowsky, Marlow; Victor J. Pavey, Horsham, both of England

[73] Assignee: Imperial Chemical Industries PLC, London, England

[21] Appl. No.: 355,618

[22] Filed: Mar. 8, 1982

[30] Foreign Application Priority Data

Mar. 19, 1981 [GB] United Kingdom ............... 8108706

[51] Int. Cl.$^3$ ............................................. C08L 27/14
[52] U.S. Cl. .................................... 524/520; 524/376; 524/389; 524/317; 524/521; 524/527
[58] Field of Search ............... 524/376, 389, 379, 317, 524/519, 520, 527, 568, 567, 545

[56] References Cited

U.S. PATENT DOCUMENTS

| | | | |
|---|---|---|---|
| 2,866,721 | 12/1958 | Hetherington | 524/520 |
| 2,976,257 | 3/1961 | Dawe | 524/520 |
| 3,075,939 | 1/1963 | Bauer | 524/520 |
| 3,232,903 | 2/1966 | Schmidle | 524/520 |
| 3,331,801 | 7/1967 | Osmond | 524/568 |
| 3,691,123 | 9/1972 | Clarke | 524/545 |
| 3,701,747 | 10/1972 | Osmond | 524/568 |
| 3,716,511 | 2/1973 | Haskell | 524/379 |
| 4,141,873 | 2/1979 | Dohany | 524/317 |
| 4,341,685 | 7/1982 | Miyake | 524/379 |

FOREIGN PATENT DOCUMENTS 1198052 7/1970 United Kingdom .

Primary Examiner—Paul R. Michl
Attorney, Agent, or Firm—Cushman, Darby & Cushman

[57] ABSTRACT

Stable dispersions of halogen-containing addition polymers, such as polyvinylidene fluoride, in water-dilutable liquid media, for example 2-butoxyethanol, are produced by dispersing pre-formed particles of the polymer, of a number-average size in the range 0.1–10 microns, in the liquid medium in the presence of a polymeric dispersant containing in the molecule a hydrophobic polymer chain and strongly ionized groups, in particular quaternary ammonium groups, the strongly ionized groups being present in such a proportion as to provide a charge density of from 0.05 to 6.0 milliequivalents per gram of the total dispersant. The dispersions thus obtained are valuable as a basis for water-borne coating compositions.

9 Claims, No Drawings

MANUFACTURE OF POLYMER DISPERSIONS

This invention relates to a process for the production of stable dispersions in water-dilutable liquids of pre-formed particles of halogen-containing addition polymers, and to water-based surface coating compositions derived from such dispersions.

It is known, from British Patent Specification No. 1,198,052, to make stable dispersions in inert organic liquids of certain synthetic polymers, including halogen-containing addition polymers, by dispersing pre-formed particles of the polymer in the liquid in the presence of, dissolved in the liquid, a stabiliser containing polar groups. The polymers in question themselves contain polar groups and these are capable of entering into strong specific interaction with the polar groups in the stabiliser, whereby the stabiliser becomes bonded to the polymer particles and provides a steric barrier at least 12 Å thick around the particles which overcomes or minimises the tendency of the latter otherwise to flocculate or aggregate. The steric barrier is constituted by molecular chains in the stabiliser which are solvated by the organic liquid and in consequence adopt an extended configuration therein. The inert organic liquids in question are in general water-immiscible and the Examples given in the aforementioned Specification include the preparation of dispersions of polyvinylidene fluoride in β-ethoxyethyl methacrylate and in isophorone, with the aid as stabiliser of a copolymer of methyl methacrylate, ethyl acrylate and N,N-dimethylaminoethyl methacrylate (85:10:5) which has been reacted with a molar equivalent of propane sultone so as to convert the tertiary amino groups into strongly ionised quaternary ammonium derivatives.

We have now found that stable dispersions of pre-formed particles of halogen-containing addition polymers, such as polyvinylidene fluoride, can surprisingly be made in water-dilutable liquid media, as contrasted with water-immiscible organic liquids, utilising polymeric dispersants containing strongly ionised groups, and that useful water-borne coating compositions can be based upon such dispersions.

According to the present invention there is provided a process for the production of a stable dispersion of a halogen-containing addition polymer, in a water-dilutable liquid medium in which the polymer is insoluble, by dispersing pre-formed particles of the polymer, of number-average size in the range 0.1–10 microns, in a water-dilutable liquid medium in the presence of a polymeric dispersant, the dispersant comprising at least one compound which contains in the molecule a hydrophobic polymer chain and strongly ionised groups as hereinafter defined, the strongly ionised groups being present in such a proportion as to provide a charge density of from 0.05 to 6.0 milliequivalents per gram of the total dispersant.

Halogen-containing addition polymers which may be prepared in dispersion by the process of the invention include polyvinyl chloride, polyvinyl fluoride, polyvinylidene chloride, polyvinylidene fluoride and polytetrafluoroethylene.

Such polymers are normally commercially available in the form of dry powder having the required primary particle size. In many cases, the polymers are the product of a process of aqueous emulsion polymerisation of the appropriate monomers, but the aqueous polymer latices so obtained are not in general suitable directly for the formulation of water-based coating compositions. The polymers are isolated in powder form from the latices by known procedures such as spray drying, centrifuging, filtration or evaporation. An example of a suitable commercially available polymer is the polyvinylidene fluoride powder of particle size 0.1–0.3 micron which is sold by Pennwalt Corporation under the name "Kynar" 500 ("Kynar" is a Registered Trade Mark).

By the term "water-dilutable liquid medium" we mean herein a liquid which is dilutable with water to an unlimited extent without the occurrence of any phase separation. Suitable water-dilutable liquids include the organic liquids methanol, ethanol, propylene glycol, 2-methoxyethanol, 2-ethoxyethanol, 2-butoxyethanol and 2-ethoxyethyl acetate, and water itself, as well as mixtures of any two or more of these. In the majority of cases, for reasons explained below, the liquid medium will be a mixture of water and a water-dilutable organic liquid. Provided that the resulting mixture is a non-solvent for the polymer to be dispersed, the relative proportions of water and water-dilutable liquid in the mixture may vary widely, but typically the liquid medium contains at least 2% of water based on the total weight of the continuous phase of the dispersion (including any portion of the film-forming polymeric dispersant which is dissolved therein); preferably it will contain at least 10% of water, and more preferably at least 50%, on that basis.

As stated above, the dispersants used according to the invention are substances containing in the molecule a hydrophobic polymer chain and a specified proportion of strongly ionised groups. By a "strongly ionised group" we mean a group which is strongly dissociated in the aqueous medium of the dispersion into ionic components; such groups are typically the salts or partial salts of strong bases, such as quaternary ammonium bases, or of strong acids, such as sulphonic or sulphonic acids. The strongly ionised groups constitute the hydrophilic component of the dispersant, which complements the hydrophobic polymer chain.

Suitable hydrophobic polymer chains include those derived from polymers or copolymers of ethylenically unsaturated monomers, in particular the polymers or copolymers of the esters of acrylic acid and methacrylic acid, for example methyl methacrylate, ethyl methacrylate, butyl methacrylate, ethyl acrylate, butyl acrylate and 2-ethylhexyl acrylate; one or more of these monomers may optionally be copolymerised with non-acrylic monomers such as styrene, vinyl toluene and vinyl acetate. The strongly ionised groups also required in the dispersant can conveniently be introduced into the molecule by way of suitable functional monomers which are co-polymerised with one or more of the aforementioned monomers. Thus, for example, strongly ionised groups of the cationic type may be introduced through copolymerisation of a tertiary amino group-containing monomer, such as dimethylaminoethyl methacrylate or vinyl pyridine, the tertiary amino groups subsequently being quaternised by reaction with, for instance, methyl iodide, butyl bromide, benzyl chloride, p-nitrobenzyl chloride, dimethyl sulphate, phenylglycidyl ether, γ-butyrolactone or propane sultone. As an alternative example, cationic groups may be also introduced by copolymerising with the other monomers vinylbenzyl chloride, and then quaternising the copolymer obtained with a tertiary amine such as trimethylamine, triethanolamine or morpholine. Yet again, cationic groups may be introduced by employing an ethylenically unsaturated epoxide, for example glycidyl acrylate or glycidyl methacrylate, as comonomer and then reacting the epoxy groups with a tertiary amine, optionally in the presence of acid.

Groups of the anionic type may be introduced by employing as functional comonomer one containing a sulphonic acid group in the molecule, for example styrene-sulphonic acid or acrylamido-2-methyl-propane-sulphonic acid, and then forming the alkali metal or ammonium salt of the polymer; alternatively, the comonomer may be one containing a hydroxyl group, for example hydroxyethyl methacrylate, subsequent reaction of the copolymer with sulphamic acid yielding directly the ammonium salt of the corresponding sulphate derivative.

The preferred strongly ionised groups are of the quaternary ammonium type—$N^+ R_1 R_2 R_3 X^-$, where $R_1$ $R_2$ and $R_3$ are alkyl or aralkyl groups such as methyl, ethyl, propyl or benzyl, or where $R_1$ and $R_2$ together constitute a cyclic substituent group such as morpholino-, and $X^-$ is an anion such as hydroxyl, chloride, bromide, iodide or sulphate.

Preferably, the strongly ionised groups are present in such a proportion as to provide a charge density of from 0.05 to 4.5 milliequivalents per gram of the dispersant, and even more preferably they provide a density of from 0.1 to 3.0 milliequivalents per gram.

Illustrations of suitable dispersants of the acrylic type include the copolymers of methyl methacrylate, ethyl acrylate and dimethylaminoethyl methacrylate in the weight ratios 85:10:5, 67.5:7.5:25 and 45:5:50 respectively, in each case quaternised by reaction with benzyl chloride, which have charge densities of 0.31, 1.33 and 2.27 milliequivalents per gram respectively, and the copolymer of methyl methacrylate, ethyl acrylate and vinylbenzyl chloride in the weight ratios 80:10:10, quaternised with trimethylamine, which has a charge density of 0.65 milliequivalent per gram.

Other suitable dispersants not of the acrylic type include copolymers derived from styrene, tert-butyl styrene, vinyl acetate or the vinyl ester of the $C_{9-11}$ branched chain aliphatic carboxylic acid known as "Versatic" acid ("Versatic" is a Registered Trade Mark) together with suitable functional monomers such as those described above, which are subsequently further reacted as necessary in order to introduce the cationic or anionic groups.

In most cases the polymeric dispersant will consist of a single compound containing in the molecule a hydrophobic polymer chain and strongly ionised groups which provide in the compound a charge density in the range hereinbefore specified. However, it lies within the scope of the invention to employ a mixture of two or more compounds of this type containing differing proportions of strongly ionised groups, or of one or more such compounds with a polymeric compound containing no strongly ionised groups at all, provided that in the mixture as a whole the proportion of strongly ionised groups is such as to correspond with a charge density in the range hereinbefore specified.

The dispersant is preferably itself introduced into the water-dilutable liquid medium, prior to the dispersing therein of the halogen-containing addition polymer particles, as a solution in a water-dilutable organic liquid, such as 2-ethoxyethylacetate, 2-butoxy ethanol or any of the other liquids of this type mentioned above; conveniently, the solvent used may be the same as the water-dilutable constituent already present in the liquid medium or, indeed, the water-dilutable constituent of the medium may be wholly derived from the solution of the dispersant. Alternatively, the dispersant may be dissolved in a water-immiscible solvent, such as ethyl acetate or butyl acetate, and this solution is then dispersed in the liquid medium before introduction of the polymer particles; the final product may then contain the solvent as an emulsified separate phase in addition to the dispersed solid phase of the addition polymer. Certain of the dispersants are, however, sufficiently water-soluble to permit their being dissolved directly in the liquid medium when this consists wholly or to a substantial extent of water.

The pre-formed particles of the addition polymer may in suitable cases be dispersed into the combination of the liquid medium and the polymeric dispersant by a simple mixing operation, but in other cases it may be desirable to subject the mixture to some degree of shear in order to break up any aggregates of the primary particles of the polymer.

The scope of the present invention does not depend upon an understanding of the mode of action of the polymeric dispersants in the process as defined, but it is believed that the hydrophobic polymer chain, being 'rejected' by the water-dilutable (and hence highly polar) medium, serves to anchor the dispersant molecule to the particles of addition polymer whilst the strongly ionised groups, being capable of being solvated by that medium, give rise to a charged steric barrier whereby those particles are stabilised in dispersion. To the extent that the dispersants used according to the invention may be similar in chemical structure to the stabilisers described in British Specification No. 1,198,052, it is thus surmised that their mode of action in the water-dilutable medium is the inverse of their mode of action in a water-immiscible non-aqueous medium as briefly discussed above.

Dispersions of halogen-containing addition polymers made according to the invention are very suitable as the basis for formulating water-borne coating compositions. However, in order to ensure that fully integrated coatings of adequate mechanical properties are obtained, it is necessary that the compositions should contain, in addition to the stabilised disperse particles of the halogenated polymer, an amount of another polymer having film-forming properties which can occupy the voids which are left between the disperse particles when the liquid medium, or continuous phase of the dispersion, has evaporated. Any suitable film-forming polymer as known in the coatings art may be employed for this purpose, but a particularly convenient procedure is to employ as the polymeric dispersant a substance as hereinbefore defined which also possesses film-forming properties in its own right, and to employ a proportion of the dispersant which is not only sufficient to stabilise the particles of the halogen-containing polymer but also to perform the required void-filling function. The polymeric dispersants which have been particularly described above, that is to say polymers or copolymers of ethylenically unsaturated monomers containing the requisite strongly ionised groups, do in general possess film-forming properties and can thus be employed in this way. The amount of the film-forming polymeric dispersant should be at least 3% of the combined weight of the dispersant and the halogen-containing polymer particles. Preferably it is at least 10% of the combined weight. The amount of the dispersant may exceed that of the halogen-containing polymer particles, up to a maximum of 75% of their combined weight, but in practice the amount will usually be at most 50% of the combined weight.

If clear, unpigmented coatings are required, the composition thus formulated may be used direct, or after modification merely by dilution with water to the extent necessary to bring them to a suitable viscosity for application to a substrate. However, more usually some degree of pigmentation of the compositions will be called for. Desirably, pigments are incorporated into the compositions with the aid of conventional pigment dispersing agents known to be effective in aqueous or water-dilutable media, but in certain cases it may be possible, and hence convenient, to employ for this purpose the same polymeric dispersant as is used for stabilising the dispersion of the halogen-containing polymer. Accordingly the pigment may be incorporated directly into the composition, if necessary with the aid of a milling or grinding operation, or a separate pigment millbase may first be made, with the assistance of the chosen dispersant, in water or a water-dilutable liquid and this then blended with the composition containing the other ingredients. Suitable pigments include any of those which are well known for use in coating compositions, of both inorganic and organic types, for example titanium dioxide, iron oxides, phthalocyanine blue and carbon black.

The pigment:binder ratios employed, that is to say the ratio of pigment weight to the combined weight of the halogen-containing polymer particles and the film-forming polymeric dispersant, will vary widely according to the particular pigment in question, and may range from as low as 0.1:1 for compositions pigmented with carbon black to as high as 1:1 for compositions incorporating very dense pigments; more typically, the ratios will be in the range of 0.25–0.6.

The total film-forming solids content of the coating compositions will typically lie in the range 30–70% by weight, more particularly in the range 40–60%.

The invention is illustrated but not limited by the following Examples, in which parts, percentages and ratios are by weight.

PREPARATION A

A copolymer dispersant was prepared by free radical polymerisation, in a conventional manner, of the following mixture:

| | |
|---|---|
| 2-Butoxyethanol | 600 parts |
| Methyl methacrylate | 340 parts |
| Ethyl acrylate | 40 parts |
| Dimethylaminoethyl methacrylate | 20 parts |
| Azodiisobutyronitrile | 8 parts |

The polymerisation was effected by heating the mixture for 2 hours at 80° C., with stirring, following which a further 4 parts of azodiisobutyronitrile were added and heating continued for a further 2 hours. There was then added 16 parts pf benzylchloride, and heating was maintained at 80° C. for 3 hours more.

The product was a water-thinnable solution, of 41% solids content, of a cationic dispersant having a charge density (quaternary ammonium groups) of 0.31 milliequivalents per gram.

PREPARATION B

The procedure of Preparation A was repeated, but replacing the polymerisation mixture described therein by the following mixture:

| | |
|---|---|
| 2-Butoxyethanol | 600 parts |
| Methyl methacrylate | 270 parts |
| Ethyl acrylate | 30 parts |
| Dimethylaminoethyl methacrylate | 100 parts |
| Azodiisobutyronitrile | 8 parts | and increasing the amount of benzyl chloride used to 80 parts.

The product was a water-thinnable solution, of 41% solids content, of a cationic polymeric dispersant having a charge density (quaternary ammonium groups) of 1.33 milliequivalents per gram.

PREPARATION C

The procedure of Preparation A was repeated, but replacing the polymerisation mixture described therein by the following mixture:

| | |
|---|---|
| 2-Butoxyethanol | 600 parts |
| Methyl methacrylate | 180 parts |
| Ethyl acrylate | 20 parts |
| Dimethylaminoethyl methacrylate | 200 parts |
| Azodiisobutyronitrile | 5.7 parts | and increasing the amount of benzyl chloride used to 160 parts.

The product was a water-thinnable solution, of 41% solids content, of a cationic polymeric dispersant having a charge density (quaternary ammonium groups) of 2.27 milliequivalents per gram.

PREPARATION D

The procedure of Preparation A was repeated, but replacing the polymerisation mixture described therein by the following:

| | |
|---|---|
| 2-Methoxyethanol | 600 parts |
| Dimethylaminoethyl methacrylate | 400 parts |
| Azodiisobutyronitrile | 4.6 parts | and increasing the amount of benzyl chloride used to 320 parts.

The product was a water-thinnable solution, of 41% solids content, of a cationic polymeric dispersant having a charge density (quaternary ammonium groups) of 3.54 milliequivalents per gram.

PREPARATION E

The following mixture was copolymerised by heating at 80° C. for 2 hours:

| | |
|---|---|
| 2-Methoxyethanol | 600 parts |
| Methyl methacrylate | 320 parts |
| Ethyl acrylate | 40 parts |
| Vinylbenzyl chloride | 40 parts |
| Azodiisobutyronitrile | 8 parts |

A further 4 parts of azodiisobutyronitrile were then added and the temperature was maintained at 80° C. for a further 2 hours. Thereafter 47 parts of a 33% solution of trimethylamine in ethanol were added and the temperature was kept at 80° C. for 3 hours more.

The product was a clear, viscous and water-thinnable solution, of 41% solids content, of a cationic polymeric dispersant having a charge density (quaternary ammonium groups) of 0.63 milliequivalent per gram.

PREPARATION F

The following polymerisation mixture was heated at 80° C. for 2 hours:

| Water | 102 parts |
|---|---|
| Dioxan | 613 parts |
| Methyl methacrylate | 108 parts |
| Ethyl acrylate | 12 parts |
| Acrylamido-2-methylpropane sulphonic acid | 80 parts |
| Azodiisobutyronitrile | 2 parts |

A further addition of 1 part of azodiisobutyronitrile was then made, followed by heating at 80° C. for 2 hours more. The resulting polymer was precipitated by adding the reaction mixture to petroleum ether (b.p. 40°-60° C.); it was then redissolved in 2-butoxyethanol and aqueous ammonia (s.g. 0.880) was added to the solution to bring the pH to approximately 8. The anionic polymeric dispersant thus obtained, as a clear, viscous and water-thinnable solution of 40% solids content, had a charge density (sulphonate salt groups) of 1.87 milliequivalents per gram.

EXAMPLE 1

(a) Preparation of pigment millbase

A white pigment millbase was prepared by ball milling or high speed mixing of the following constituents:

| Titanium dioxide ("Tipure" R960, ex duPont: "Tipure is a Registered Trade Mark) | 54.1 parts |
|---|---|
| Solution of polymeric dispersant as described in Preparation A above | 13.5 parts |
| De-ionised water | 13.5 parts |
|  | 32.4 parts |

The milling or mixing operation was continued until the dispersed pigment had a particle size of 5 microns or less, as measured with a Hegman gauge. A further 12 parts of the polymeric dispersant were then stirred in, giving a total millbase weight of 112 parts.

(b) Preparation of halogenated polymer dispersion base

The following ingredients were blended by ball milling or high speed mixing:

| Polyvinylidene fluoride powder, average particle size 0.1-0.3 micron ("Kynar" 500, ex Pennwalt Corporation: "Kynar" is a Registered Trade Mark) | 86.6 parts |
|---|---|
| Solution of polymeric dispersant as described in Preparation A above | 27.4 parts |
| Water | 55.0 parts |

(c) Preparation of a white, high durability paint

By simple mixing, there were blended together 112 parts of the millbase described in (a) above, 169 parts of the polymer dispersion described in (b) above and sufficient water to adjust the viscosity to 30 secs. measured in a Zahn No. 4 cup, this being a convenient viscosity for subsequent application. The resulting paint had a pigment: binder ratio of 0.5:1.0 and the ratio of halogen-containing polymer to polymeric dispersant was 80:20, the total solids content was 57.9%. The paint was applied by means of a K-bar spreader to an aluminium panel, so as to give a dry film thickness of 25 microns. The film was stoved at 249°-254° C. for 60 seconds. The coating so obtained was well integrated and had the following gloss values as measured with a standard glossmeter: 60° head, 32; 80° head, 54. After 500 hours exposure to the Atlas XWR accelerated weathering test, the coating was substantially unaffected.

(d) Preparation of an unpigmented coating composition

To 169 parts of the polymer dispersion described in (b) above were added 26.7 parts further of the solution of polymeric dispersant described in Preparation A and 42 parts of water. The resulting clear composition, having a solids content of 45.8%, was applied to an aluminium panel in the same manner as in (c) above. A clear coating having similar properties to those of the coating described in (c) was obtained.

EXAMPLE 2

The procedure of Example 1 was repeated, but replacing the polymeric dispersant as described in Preparation A, in both the pigment millbase and the polymer base, by each in turn of the dispersants described in Preparations B-D. The paints so obtained gave similar results to those described in Example 1(c), with the following gloss values:

| Dispersant | 60° head | 85° head |
|---|---|---|
| Preparation B | 18 | 63 |
| Preparation C | 16 | 56 |
| Preparation D | 9 | 15 |

EXAMPLE 3

The procedure of Example 1 was repeated, but replacing the polymeric dispersant as described in Preparation A, in both the pigment millbase and the polymer base, by the polymeric dispersant as described in Preparation E.

Similar results to those described in Example 1 were obtained.

EXAMPLE 4

The procedure of Example 1 was repeated, but replacing the polymeric dispersant as described in Preparation A, in both the pigment millbase and the polymer base, by the polymeric dispersant described in Preparation F.

Similar results to those described in Example 1 were obtained.

EXAMPLE 5

(a) Preparation of halogenated polymer dispersion base

The following ingredients were blended using a high speed stirrer:

| Polyvinyl chloride powder ("Breon" P130/1, average particle size 5 microns, ex B.P. Chemicals Ltd). | 120 parts |
|---|---|
| Solution of polymeric dispersant as described in Preparation C above | 35 parts |

-continued

| | | |
|---|---|---|
| Plasticiser ("Paraplex" G41 ex Rohm & Haas). | 25 | parts |
| Heat stabiliser ("Stanclere" T135 ex Akzo Chemicals) | 2 2 | parts parts |
| Water | 70 | parts |

"Breon", "Paraplex" and "Stanclere" are Registered Trade Marks.

(b) Preparation of white paint

With 252 parts of the polymer dispersion described in (a) above were blended 100 parts of the white pigment millbase described in Example 1(a), and the viscosity of the blend was then adjusted by addition of water.

The resulting paint was spread on an aluminium panel and stoved at 195° C. for 3 minutes. A white, integrated coating was obtained.

EXAMPLE 6

The following ingredients were mixed together:

| | | |
|---|---|---|
| Solution of Polymer G (as described below) | 26.67 | parts |
| Solution of Polymer H (as described below) | 26.67 | parts |
| 2-Butoxyethanol | 26.67 | parts |

The following were then ground together with steatite balls in a ball mill for 16 hours:

| | |
|---|---|
| Mixture as described above | 80 parts |
| Water | 80 parts |
| Polyvinylidene fluoride powder ("Kynar" 500: see Example 1(b).) | 80 parts |
| Titanium dioxide ("Tipure" R960: see Example 1(a).) | 50 parts |

The resulting water-thinnable paint was applied to an aluminium panel and stoved at 250° C. for 60 seconds, producing a white, well-integrated film.

Polymer G used in this Example was a copolymer of 2-hydroxyethyl methacrylate, ethyl acrylate and methyl methacrylate in the ratios 10:9:81, used as a 55% solids solution in methyl isobutyl ketone.

Polymer H used in this Example was a homopolymer of dimethylaminoethyl methacrylate quaternised with benzyl chloride, prepared analogously to Preparation D above but in 2-butoxyethanol as solvent. The polymer had a charge density of 3.5 and was used as a 40% solids solution in 2-butoxyethanol.

We claim:

1. A water-borne coating composition which comprises a stable dispersion, in an aqueous medium consisting of a mixture of (i) water and (ii) an organic liquid which is dilutable with water to an unlimited extent without the occurrence of any phase separation, of a halogen-containing addition polymer which is insoluble in the said aqueous medium, the dispersion having been made by dispersing pre-formed particles of the polymer in powder form, of number-average size in the range 0.1–10 microns, in the aqueous medium in the presence of a polymeric dispersant, the dispersant comprising at least one compound which contains in the molecule a hydrophobic polymer chain and groups which are strongly dissociated in the aqueous medium into ionic components, the strongly ionised groups being present in such a proportion as to provide a charge density of from 0.05 to 6.0 milliequivalents per gram of the total dispersant.

2. A water-borne coating composition as claimed in claim 1, wherein the halogen-containing addition polymer is selected from polyvinyl chloride, polyvinyl fluoride, polyvinylidene chloride, polyvinylidene fluoride and polytetrafluoroethylene.

3. A water-borne coating composition as claimed in claim 1 or claim 2, wherein the water-dilutable liquid constituent of the aqueous medium is selected from methanol, ethanol, propylene glycol, 2-methoxyethanol, 2-ethoxyethanol, 2-butoxyethanol, 2-ethoxyethyl acetate and water, or a mixture of any two or more thereof.

4. A water-borne coating composition as claimed in any one of claims 1 or 2, wherein the hydrophobic polymer chain in the dispersant is a polymer or copolymer of one or more esters of acrylic acid or methacrylic acid, optionally copolymerized with non-acrylic monomers.

5. A water-borne coating composition as claimed in claim 4, wherein the strongly ionised groups in the dispersant are of the quaternary ammonium type $-N^+R_1 R_2 R_3.X^-$, where $R_1$ $R_2$ and $R_3$ are alkyl or aralkyl groups, or where $R_1$ and $R_2$ together constitute a cyclic grouping, and $X^-$ is an anion, the strongly ionised groups being introduced into the molecule by way of suitable functional monomers which are copolymerized with the monomers from which the hydrophobic polymer chain is derived.

6. A water-borne coating composition as claimed in claim 5, wherein the dispersant is a copolymer selected from the copolymers of methyl methacrylate, ethyl acrylate and dimethylaminoethyl methacrylate in the weight ratios 85:10:5, 67.5:7.5:25 and 45:5:50 respectively, in each case quaternized with benzyl chloride.

7. A water-borne coating composition as claimed in claim 5, wherein the dispersant is the copolymer of methyl methacrylate, ethyl acrylate and vinylbenzyl chloride in the weight ratios 80:10:10, quaternized with trimethylamine.

8. A water-borne coating composition as claimed in any one of claims 1 or 2, wherein the dispersant possesses film-forming properties and is used in an amount of at least 3% of the combined weight of the dispersant and the halogen-containing polymer particles.

9. A composition as claimed in claim 1 which additionally incorporates one or more pigments such that the ratio of the weight of pigment to the combined weight of the halogen-containing polymer particles and the dispersant is in the range 0.25 to 0.6.

* * * * *